(12) United States Patent
Suri et al.

(10) Patent No.: US 8,924,534 B2
(45) Date of Patent: Dec. 30, 2014

(54) RESOURCE OPTIMIZATION AND MONITORING IN VIRTUALIZED INFRASTRUCTURE

(75) Inventors: Salil Suri, Bangalore (IN); Harish Chilkoti, Bangalore (IN); Anand Shrivastava, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 598 days.

(21) Appl. No.: 12/606,875

(22) Filed: Oct. 27, 2009

(65) Prior Publication Data

US 2011/0099267 A1  Apr. 28, 2011

(51) Int. Cl.
  *G06F 15/173* (2006.01)
  *G06F 9/48* (2006.01)
  *G06F 9/50* (2006.01)
  *G06F 9/455* (2006.01)

(52) U.S. Cl.
  CPC ............ *G06F 9/4856* (2013.01); *G06F 9/5022* (2013.01); *G06F 2009/45575* (2013.01); *G06F 2209/504* (2013.01)
  USPC ........... 709/224; 709/213; 709/220; 709/226; 370/254; 719/313; 718/1

(58) Field of Classification Search
  CPC ............ H04L 43/00; H04L 29/08981; H04L 41/0806; H04L 41/12; H04L 45/02; H04L 45/00; H04L 45/04; H04L 29/08144; H04L 29/08171; H04L 12/5695; H04W 84/18; G06F 9/54; G06F 9/5077; G06F 9/45537
  USPC ....................................................... 709/224
  See application file for complete search history.

(56) References Cited

U.S. PATENT DOCUMENTS

| | | | |
|---|---|---|---|
| 4,912,628 A | 3/1990 | Briggs |
| 4,949,254 A | 8/1990 | Shorter |
| 5,072,376 A | 12/1991 | Ellsworth |
| 5,416,726 A | 5/1995 | Garcia-Duarte et al. |
| 5,530,860 A | 6/1996 | Matsuura |
| 5,845,138 A | 12/1998 | Nowlin, Jr. |
| 6,065,046 A | 5/2000 | Feinberg et al. |
| 6,075,938 A | 6/2000 | Bugnion et al. |
| 6,223,202 B1 | 4/2001 | Bayeh |
| 6,269,043 B1 | 7/2001 | Batcher |
| 6,397,242 B1 | 5/2002 | Devine et al. |
| 6,442,652 B1 | 8/2002 | Laboy et al. |
| 6,496,847 B1 | 12/2002 | Bugnion et al. |
| 7,191,440 B2 | 3/2007 | Cota-Robles et al. |
| 7,225,441 B2 | 5/2007 | Kozuch et al. |

(Continued)

OTHER PUBLICATIONS

Ravi Rajwar et al., "Speculative Lock Elision: Enabling Highly Concurrent Multithreaded Execution," IEEE Xplore, 2001, pp. 294-305.

(Continued)

*Primary Examiner* — Phuoc Nguyen
*Assistant Examiner* — Kishin G Belani

(57) ABSTRACT

A method includes monitoring a resource consumption of one or more virtual machines on a host computer in a computer network, and suspending the one or more virtual machines based on the resource consumption to free one or more resources on the host computer. The method also includes losslessly handling a request intended for the suspended one or more virtual machines to seamlessly resume the suspended one or more virtual machines. The request includes a network traffic intended for the suspended one or more virtual machines and/or a non-network request.

18 Claims, 10 Drawing Sheets

(56) References Cited

U.S. PATENT DOCUMENTS

| | | | |
|---|---|---|---|
| 7,379,422 | B2 | 5/2008 | Nation |
| 7,383,368 | B2 | 6/2008 | Schopp |
| 7,765,543 | B1 | 7/2010 | Weissman |
| 2002/0083110 | A1* | 6/2002 | Kozuch et al. .................. 709/1 |
| 2003/0037089 | A1 | 2/2003 | Cota-Robles et al. |
| 2003/0041090 | A1 | 2/2003 | Armstrong et al. |
| 2003/0055864 | A1 | 3/2003 | Armstrong et al. |
| 2008/0201455 | A1* | 8/2008 | Husain ........................ 709/220 |
| 2009/0049453 | A1* | 2/2009 | Baran et al. .................. 719/313 |
| 2010/0153514 | A1* | 6/2010 | Dabagh et al. ............... 709/213 |
| 2010/0165877 | A1* | 7/2010 | Shukla et al. ................ 370/254 |
| 2010/0257524 | A1 | 10/2010 | Weisman |
| 2010/0332658 | A1* | 12/2010 | Elyashev .................... 709/226 |

OTHER PUBLICATIONS

"Intel Architecture Software Developer's Manual," vol. 2: Instruction Set Reference, Order No. 23191, 1999, 2 pages.

x86 Instruction Set Reference, HLT, Halt, printed Dec. 8, 2008, http://siyobik.info/index.php?module=x86&id=134, 1 page.

x86 Instruction Set Reference, Pause, Spin Loop Hint, printed Dec. 8, 2008, http://siyobik.info/index.php?module=x86&id=232, 1 page.

Whitaker et al., "Denali: A Scalable Isolation Kernel", ACM, 2002, pp. 1-6.

Whitaker, Andrew et al., "Denali: Lightweight Virtual Machines for Distributed and Networked Applications", The University of Washington, 2002, pp. 1-14.

Waldspurger, Carl A., "Memory Resource Management in VMware ESX Server", VMware, 2002, pp. 1-14.

Sugerman, Jeremy et al., "Virtualizing I/O Devices on VMware Workstation's Hosted Virtual Machine Monitor", VMware, 2001, pp. 1-14.

Microsoft Computer Dictionary, Fifth Edition, retrieved on Mar. 12, 2009 From http://proquest.safaribooksonline.com, 1 page.

* cited by examiner

RESOURCE OPTIMIZATION AND MONITORING IN VIRTUALIZED INFRASTRUCTURE

BACKGROUND

Virtualization may enable multiple operating systems to run on one physical host computer. The number of virtual machines (VMs) per physical host computer has seen an increase in recent times with the advent of powerful hardware. As hardware becomes even more powerful, higher consolidation ratios of VMs on a host computer may be expected. As higher workloads are being consolidated in a host computer, the advantage a customer/user has may directly be proportional to the workloads and/or the number of applications being involved.

FIG. 1 shows a virtual machine (VM) system 100 including a cluster of three host computers (host computer 108, host computer 112, and host computer 116) as an example. The host computers (108, 112, and 116) may be individually interfaced with a number of VMs ($110_1, 110_2, 110_3 \ldots 110_N$, $114_1, 114_2, 114_3 \ldots 114_N$, and $118_1, 118_2, 118_3 \ldots 118_N$ respectively) to form host system 1 102, host system 2 104, and host system 3 106. When the load on the host computer 108 is high and host computer 112 in the cluster does not have any load whatsoever or is unused, a portion of the load on the host computer 108 may be distributed to host computer 112. Thus, loads on host computers (108, 112, and 116) may be distributed across one another to achieve high consolidation on each host computer (108, 112, and 116). The VM system 100 may have a management console 120 to provide a user 124 interface to the cluster through a network 122.

SUMMARY

In one aspect, a method includes monitoring a resource consumption of one or more virtual machines on a host computer in a computer network and suspending the one or more virtual machines based on the resource consumption to free one or more resources on the host computer. The method also includes losslessly handling a request intended for the suspended one or more virtual machines to seamlessly resume the suspended one or more virtual machines. The request includes a network traffic intended for the suspended one or more virtual machines and/or a non-network request.

In another aspect, a method includes suspending one or more virtual machines on a host computer in a computer network based on a resource consumption to free one or more resources on the host computer, and queuing a request intended for the suspended one or more virtual machines at an appliance virtual machine. The method also includes sending a broadcast packet data from the appliance virtual machine to seamlessly resume the suspended one or more virtual machines, and routing the request intended for the suspended one or more virtual machines to the resumed one or more virtual machines based on the queue at the appliance virtual machine.

In yet another aspect, a computer network includes a cluster of a number of host computers. Each of the plurality of host computers includes one or more virtual machines. The computer network also includes a kernel module to monitor a resource consumption of the one or more virtual machines on a corresponding host computer, and an appliance virtual machine, coupled to a virtual switch in the kernel module and configured to enable routing of a request intended for the one or more virtual machines.

The one or more virtual machines are suspended by the kernel module when the resource consumption of the one or more virtual machines is less than a threshold value. A request intended for the suspended one or more virtual machines is queued at the appliance virtual machine. A broadcast packet data is sent from the appliance virtual machine to seamlessly resume the suspended one or more virtual machines. The request intended for the suspended one or more virtual machines is routed through the appliance virtual machine to the resumed one or more virtual machines based on the queue at the appliance virtual machine.

DETAILED DESCRIPTION

Figure 1:
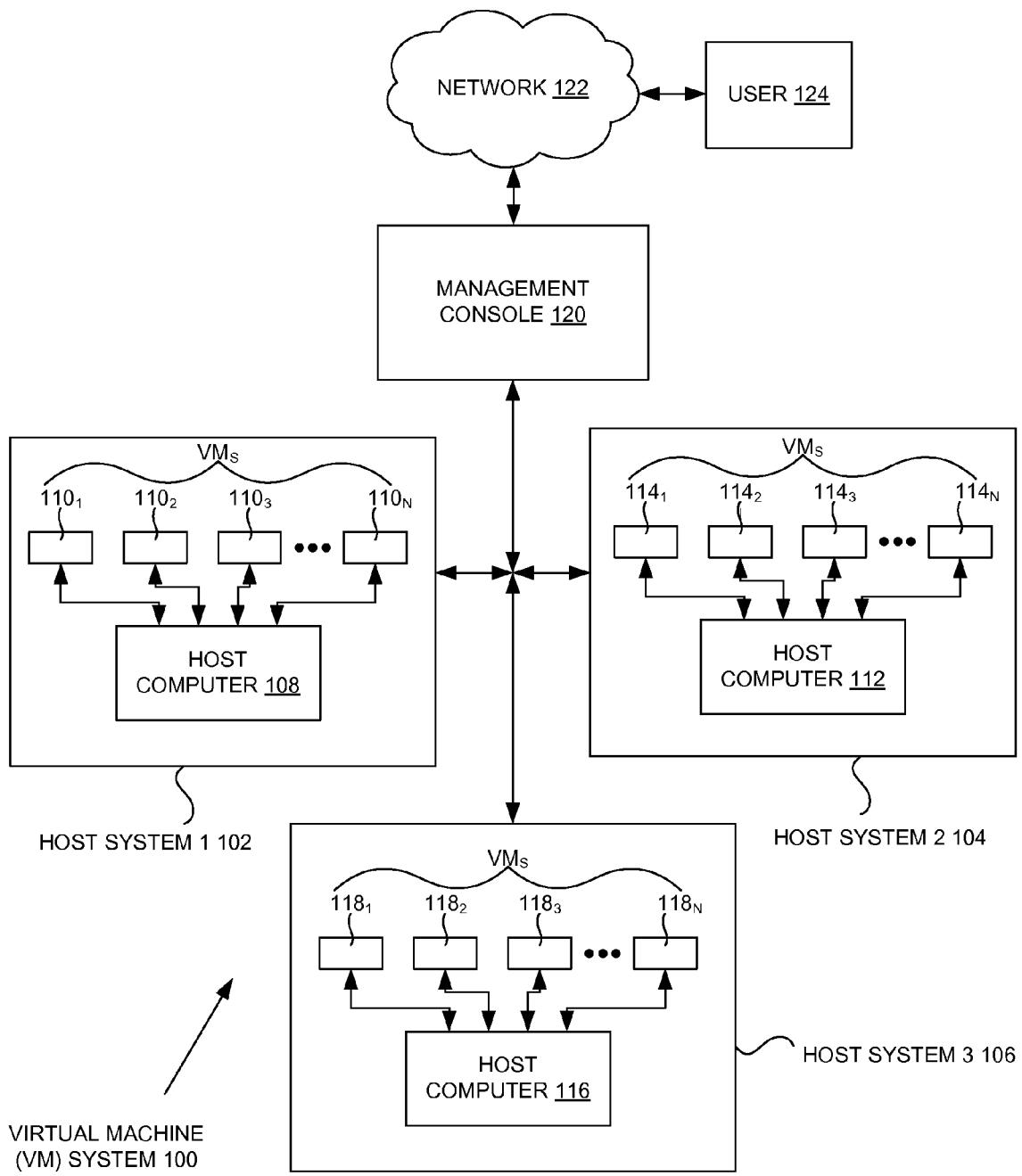
FIG. 1 is a schematic view of a virtual machine (VM) system including a cluster of host computers.
Figure 2:
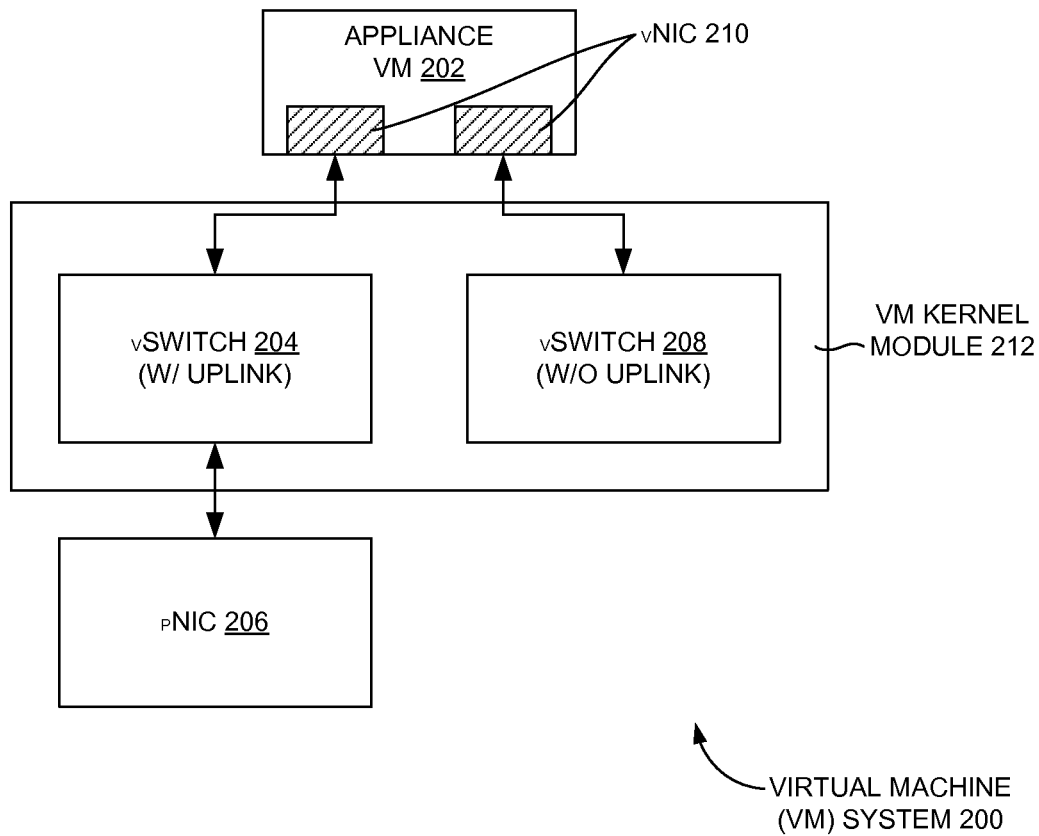
FIG. 2 is a schematic view of a VM system, according to one or more embodiments.

FIG. 2 shows a VM system 200, according to one or more embodiments. In one or more embodiments, the VM system 200 may include a VM kernel module 212 that monitors the resource utilization of one or more VMs residing on the same host computer as appliance VM 202 or on a different host computer. In one or more embodiments, virtual switch (vswitch) 204 and vswitch 208 may be operating in the VM kernel module 212 due to high performance requirements. In one or more embodiments, vswitch 204 and vswitch 208 may be analogous to a physical switch translated to the virtualization environment. In one or more embodiments, appliance VM 202 may act as a gateway, a router, and/or a firewall through which network traffic is channeled. Therefore, appliance VM 202 may alternately be called as a gateway VM. For example, all packets destined for the one or more VMs residing on the same host computer as appliance VM 202 and for the one or more VMs residing on a different host computer may necessarily need to pass through the appliance VM 202.

In one or more embodiments, appliance VM 202 may reside on a host computer in a datacenter. In one or more embodiments, appliance VM 202 may have two virtual network interface cards (vNICs) 210 associated with vswitch 204 and vswitch 208. In one or more embodiments, vNICs 210 may logically couple appliance VM 202 or any VM to the corresponding virtual interfaces, i.e., vswitch 204 and vswitch 208, and may enable appliance VM 202 or any other VM to send and receive network traffic through the interfaces. In one or more embodiments, one vNIC 210 may be in the public network, and may be connected to vswitch 204 having a physical network interface card (pNIC) 206 as an uplink. In other words, connectivity to the external physical world may be provided through pNIC 206. Therefore, vswitch 204 is shown as vswitch (w/uplink) 204 in FIG. 2. In one or more embodiments, another vNIC 210 may be a part of a private network, and may be connected to vswitch 208 having no uplink. Therefore, vswitch 208 may have no connectivity to the external physical world, and is shown as vswitch (w/o uplink) 208 in FIG. 2.

Figure 3:
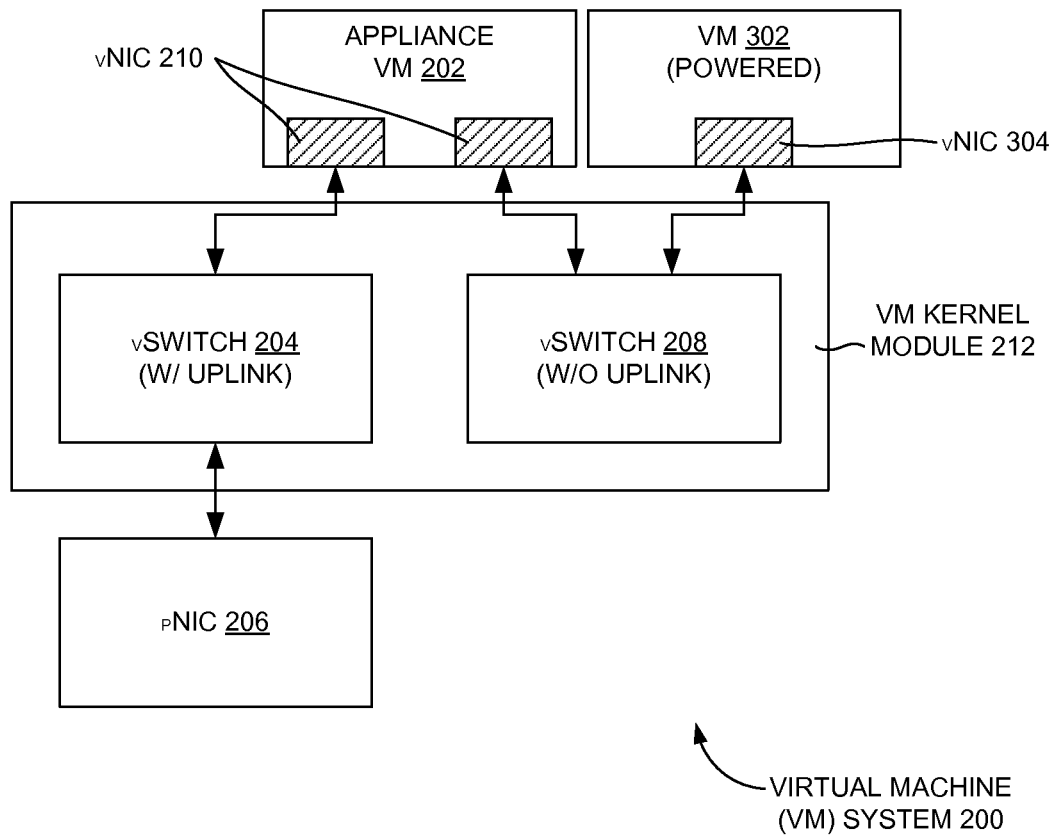
FIG. 3 is a schematic view of the VM system of FIG. 2 including a VM in a powered state, according to one or more embodiments.

FIG. 3 shows the VM system 200 of FIG. 2 including a VM 302 in a powered state, according to one or more embodiments. In one or more embodiments, VM 302 may be coupled to vswitch 208, to which appliance VM 202 is also coupled. In one or more embodiments, a vNIC 304 may interface VM 302 with vswitch 208. In one or more embodiments, as discussed above, resource utilization in VM 302 may be monitored by the VM kernel module 212. In one or more embodiments, VM 302 may also be resident on a host computer different from the one where appliance VM 202 is resident.

In one or more embodiments, the VM kernel module 212 may monitor one or more of a central processor (e.g., Central Processing Unit (CPU)) utilization by VM 302, a memory utilization by VM 302, network Input/Output (I/O) by VM 302, and storage I/O by VM 302. In one or more embodiments, information regarding the aforementioned resource utilization may be sent to the user interface (UI), management Application Programming Interfaces (APIs), and/or appliance VM 202.

In one or more embodiments, an "idling" state of VM 302 may be defined as a state of minimal use of resources available for use by VM 302. In one or more embodiments, resources available to VM 302 may be user assigned. For example, a user may assign 4 GB of memory in the physical box, out of which only 1 GB may be used. In one or more embodiments, the user may define a threshold value of use of each of the resources, below which VM 302 may be considered to be "idling." In one embodiment, a profile for resource utilization by VM 302 may be set-up to determine "idling."

For example, the threshold value for memory utilization may be 10% of the user assigned memory. In one embodiment, data associated with modified memory pages may be used to determine memory usage. Here, the lesser the number of modified pages, the lesser the memory consumption. In another example, the threshold value for central processor (e.g., CPU) utilization may be 2%. Further, for example, the network I/O associated with VM 302 may be monitored, i.e., the transmitted/received packet count for VM 302. In one or more embodiments, when the packet count is nearly static or very low, which indicates no network activity or low network activity, VM 302 may be considered to be "idling." In one or more embodiments, network data may be sifted through carefully to account for broadcast/multicast packets. In one or more embodiments, unicast packet data associated with VM 302 may alone be analyzed.

In yet another example, the threshold value for storage utilization may be 25% of the allocated storage. Here, storage I/O for VM 302 is taken into account along with read/write storage. In one or more embodiments, statistics for the above-mentioned resource utilization in VM 302 may be reported to the user as a scheduled task. In one or more embodiments, the "idling" may be defined at one or more of an individual VM level, datacenter level, virtual application level, and host computer level. In one or more embodiments, the user may be prompted with benchmark suggestions, if required.

In one or more embodiments, once the threshold values for resource utilization have been set, the VM kernel module 212 monitors VM 302 (or a number of VMs) for "idling" candidates defined by the specified criteria. In one or more embodiments, a UI display of the VMs being monitored may be provided, along with the results stored. In one or more embodiments, when VM 302 is in an "idling" state, a fully automated decision may be taken in a policy driven manner. In one embodiment, the decision may also be user prompted.

FIG. 3 shows VM 302 coupled to vswitch 208, to which appliance VM 202 is also coupled. However, in one or more embodiments, VM 302 may merely reside on the same host computer as appliance VM 202 or may reside on a different host computer. In one or more embodiments, when VM 302 is in the "idling" state, the VM kernel module 212 may move VM 302 to the same vswitch (vswitch 208) to which appliance VM 202 is connected. In one or more embodiments, when the "idling" VM 302 resides on the same host computer as appliance VM 202, the VM kernel module 212 may merely decouple VM 302 from the vswitch to which VM 302 is coupled, and couple VM 302 to the vswitch 208 where appliance VM 202 is coupled.

Figure 4:
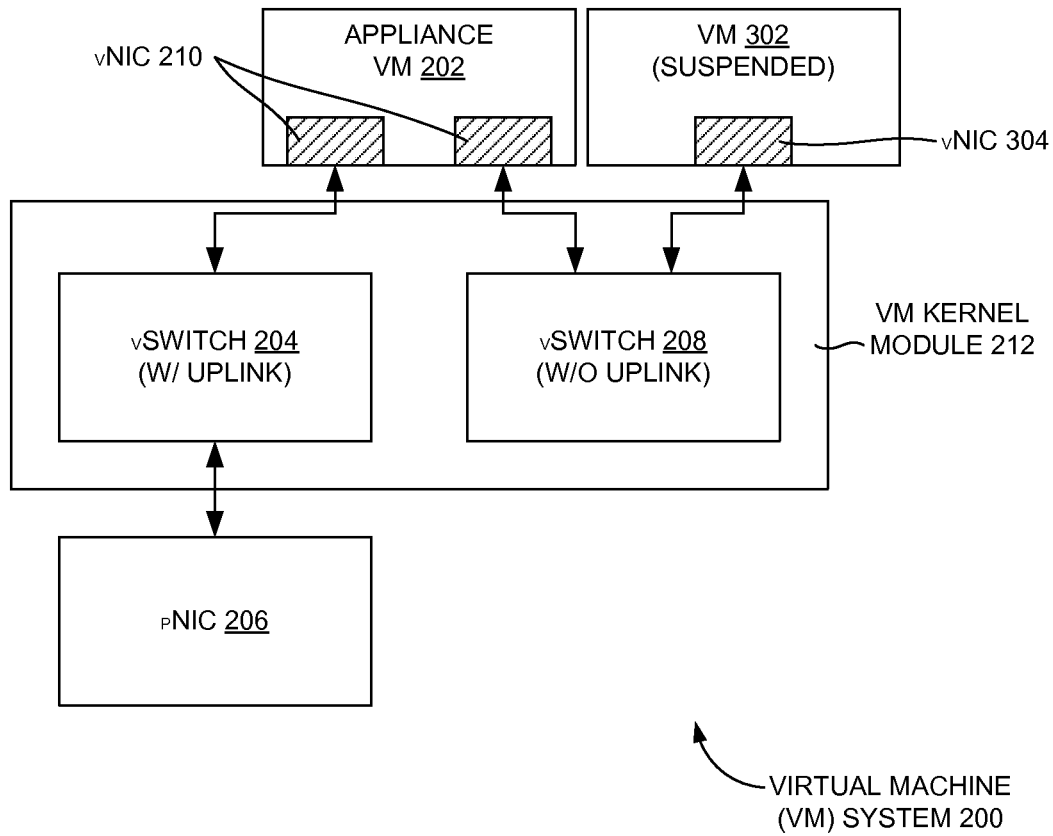
FIG. 4 is a schematic view of the VM system of FIG. 2 and the VM of FIG. 3 in a suspended state, according to one or more embodiments.

FIG. 4 shows the VM system 200 of FIG. 2, and VM 302 of FIG. 3 in a suspended state, according to one or more embodiments. Here, VM 302 has been decoupled from the vswitch to which VM 302 was connected prior to being coupled to vswitch 208 through the aid of resource monitoring done by the VM kernel module 212. In one or more embodiments, when the "idling" VM 302 is on a different host computer, VM 302 may first be migrated (e.g., using VMware®'s VMotion™) to the host computer on which appliance VM 202 is resident without any downtime. In one or more embodiments, VM 302 may then be checked for automatic command completion before being coupled to vswitch 208, where appliance VM 202 is coupled.

In one or more embodiments, the routing information of appliance VM 202 may be updated once VM 302 is moved to vswitch 208, to which appliance VM 202 also is coupled. In one or more embodiments, appliance VM 202 may save identification data (e.g., Media Access Control (MAC) address, Internet Protocol (IP) information) associated with VM 302. In one or more embodiments, as all requests, i.e., network traffic destined for VM 302, may have to go through appliance VM 202, appliance VM 202 may cause a physical switch (not shown) coupled to pNIC 206 to update a table (e.g., Content Addressable Memory (CAM) table), thereby allowing traffic destined for VM 302 to first be routed to appliance VM 202. In one or more embodiments, appliance VM 202 may, therefore, act as a gateway for VM 302. In one or more embodiments, non-network requests may also be destined for VM 302.

In one or more embodiments, non-network requests may include at least one of network protocol requests, storage protocol requests, communication between a number of VMs (including VM 302) on a host computer, and communication between VM 302 and the associated host computer. For example, communication between a number of VMs on a host computer and communication between VM 302 and the associate host computer may be enabled through a Virtual Machine Communication Interface (VMCI).

In one or more embodiments, once appliance VM 202 updates the routing information thereof for VM 302 (or a number of VMs in the general case), the VM kernel module 212 may suspend VM 302 (see FIG. 4). In one or more embodiments, just prior to the suspension of VM 302, the configuration of VM 302 may be saved. In one or more embodiments, as discussed above, command completion may be ensured prior to the suspension of VM 302.

In one or more embodiments, the monitoring data, the actions taken and/or the VMs suspended may be presented to the user via the UI through appliance VM 202 or the virtual center UI. In one or more embodiments, the monitoring data may enable the tracking of VMs not being used, and the time of non-use of the VMs. For example, the data presented to the user through the UI may indicate a number of VMs, a number of suspended VMs, time of inactivity of VMs, resources associated with inactive VMs and/or actions taken till the time of presentation of the data.

Figure 5:
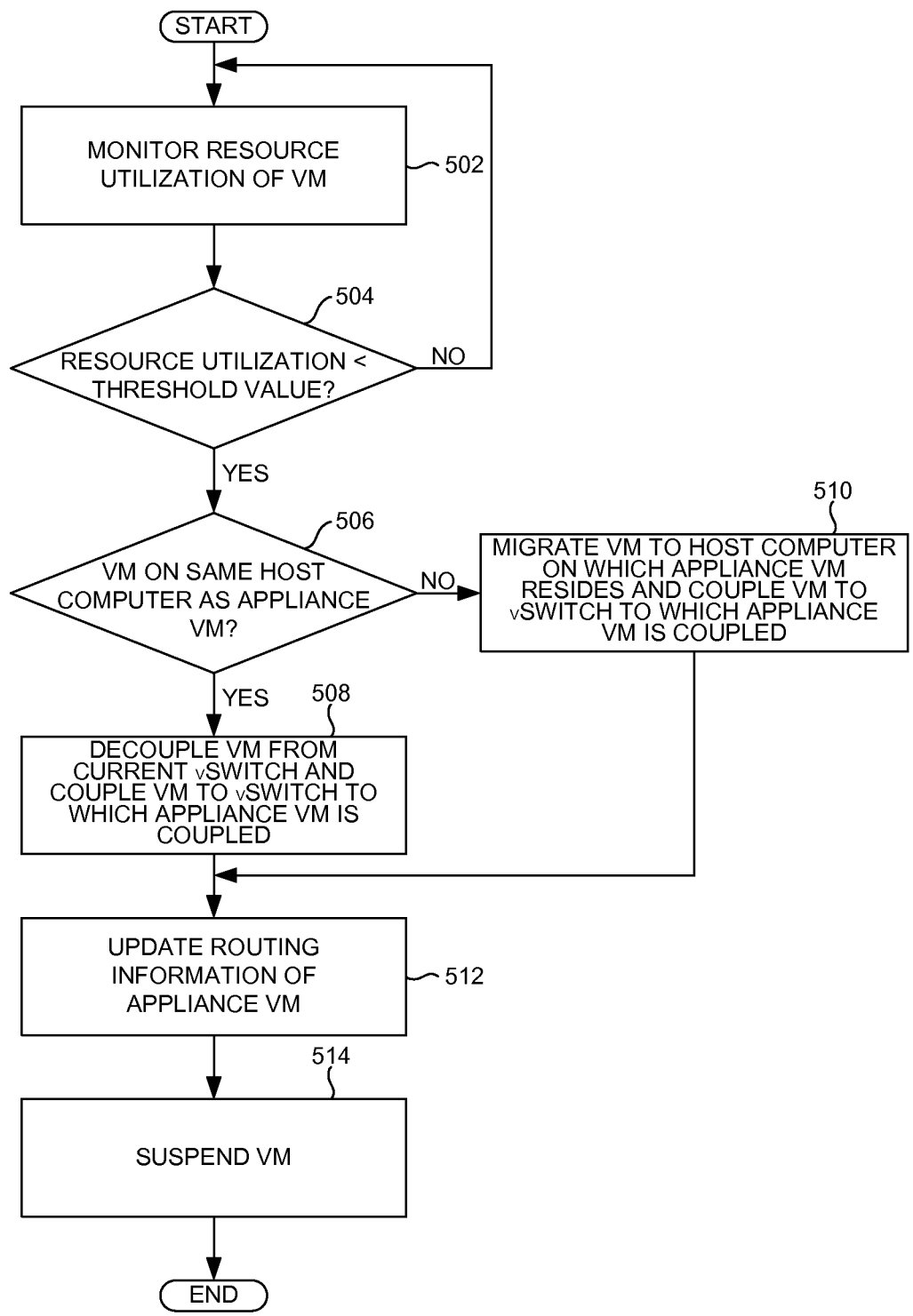
FIG. 5 is a flowchart detailing the operations involved in suspending a VM, according to one or more embodiments.

FIG. 5 shows a flowchart detailing the operations involved in suspending VM 302, according to one or more embodiments. In one or more embodiments, operation 502 may involve monitoring resource utilization of VM 302 through the VM kernel module 212. In one or more embodiments, operation 504 may involve checking for whether the resource utilization in VM 302 is below a threshold value set. In one or more embodiments, if yes, operation 506 may involve checking for whether VM 302 resides on the same host computer as appliance VM 202. In one or more embodiments, if the resource utilization is not below the threshold value, monitoring of resource utilization in VM 302 is continued, as shown in FIG. 5.

In one or more embodiments, if VM 302 resides on the same host computer as appliance VM 202, operation 508 may involve decoupling of VM 302 from the current vswitch to which VM 302 is coupled, and coupling of VM 302 to vswitch 208 to which appliance VM 202 is coupled. In one or more embodiments, if VM 302 resides on a different host computer, operation 510 may involve migration of VM 302 to the host computer on which appliance VM 202 resides, and coupling of VM 302 to vswitch 208 to which appliance VM 202 is coupled. In one or more embodiments, operation 512 may involve updating of the routing information of appliance VM 202. In one or more embodiments, VM 302 may then be suspended in operation 514.

In one or more embodiments, a suspended VM 302 may be powered on by a user. In one or more embodiments, suspended VM 302 may be powered on automatically when there is a request destined for VM 302. In one or more embodiments, when the user powers on VM 302, the VM kernel module 212 may resume VM 302 and, from the information available from the appliance VM 202, may move VM 302 to the appropriate vswitch or to an appropriate host computer through migration (e.g., using VMware®'s VMotion™). In one or more embodiments, prior to migration of VM 302 to another host computer, a memory snapshot (e.g., including registers, instructions) of VM 302 may be taken as the host computers share a common storage. In one or more embodiments, VM 302 may also continue to use the same vswitch 208 to which appliance VM 202 may be coupled. In one or more embodiments, in this case, all requests for VM 302 may go through appliance VM 202.

In one or more embodiments, traffic specific to suspended VM 302 may first reach appliance VM 202, which may, based on the suspended state of VM 302, first save the packets in the traffic destined for suspended VM 302. In one or more embodiments, appliance VM 202 may then send network messages in the form of broadcast packets (e.g., wake-on-LAN (WOL)) to "wake up" VM 302.

In one or more embodiments, VM 302 may then be "woken up," and resumed through the aid of the broadcast packets. In one or more embodiments, the network messages may ensure that VM 302 is fully resumed prior to the signaling of the success of the resume operation back to appliance VM 202. In one or more embodiments, when VM 302 comes back "online," either on the same host computer as appliance VM 202 or a new host computer, appliance VM 202 may transmit the packets in the traffic destined for VM 302 to VM 302.

Figure 6:
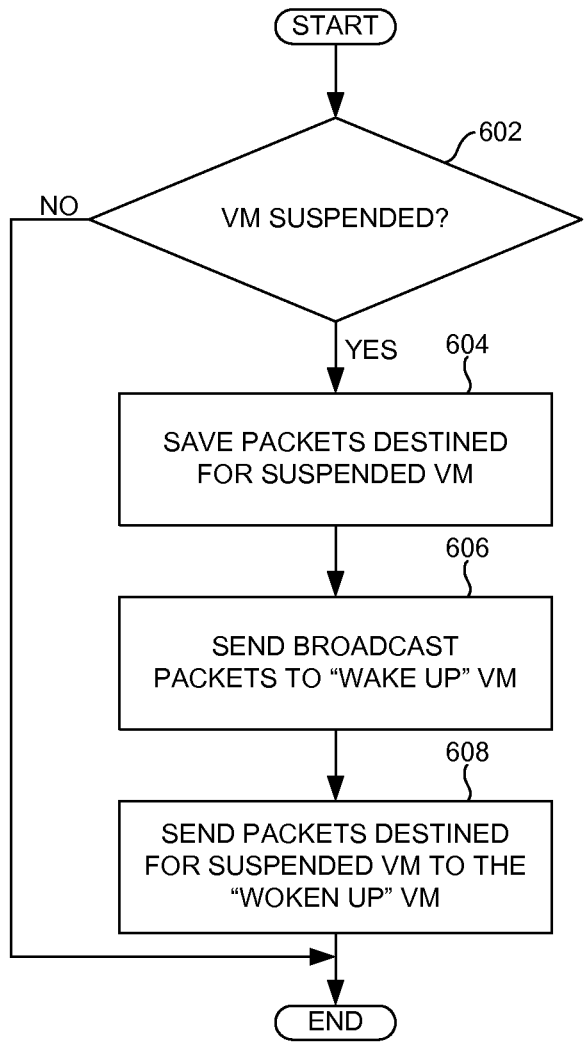
FIG. 6 is a flowchart detailing the operations involved in transmitting packets destined for a suspended VM to the suspended VM, according to one or more embodiments.

The abovementioned process is summarized in the flowchart shown in FIG. 6. In one or more embodiments, operation 602 may involve checking for suspension of VM 302. In one or more embodiments, if VM 302 is suspended, operation 604 may involve appliance VM 202 saving network traffic, i.e., packets, intended for suspended VM 302. In one or more embodiments, operation 606 may involve sending broadcast packets from appliance VM 202 to "wake up" VM 302. In one or more embodiments, operation 608 may involve sending the packets destined for suspended VM 302 to the "woken up" VM 302.

In one or more embodiments, non-network requests intended for suspended VM 302 may be communicated to suspended VM 302 through the VM kernel module 212. In one or more embodiments, suspended VM 302 may, again, be "woken up." Therefore, in one or more embodiments, requests intended for the suspended VM 302 may be losslessly handled.

In one or more embodiments, when VM 302 is in a suspended state for a time period exceeding another threshold value, VM 302 may be construed as not being actively used. In one or more embodiments, an administrator or the user may be prompted with an option to permanently free up resources related to VM 302 or an option to continue to monitor VM 302 for longer. In one or more embodiments, this may be interpreted as a way to identify unused capacity in the datacenter, and a chance to optimize.

Figure 7:
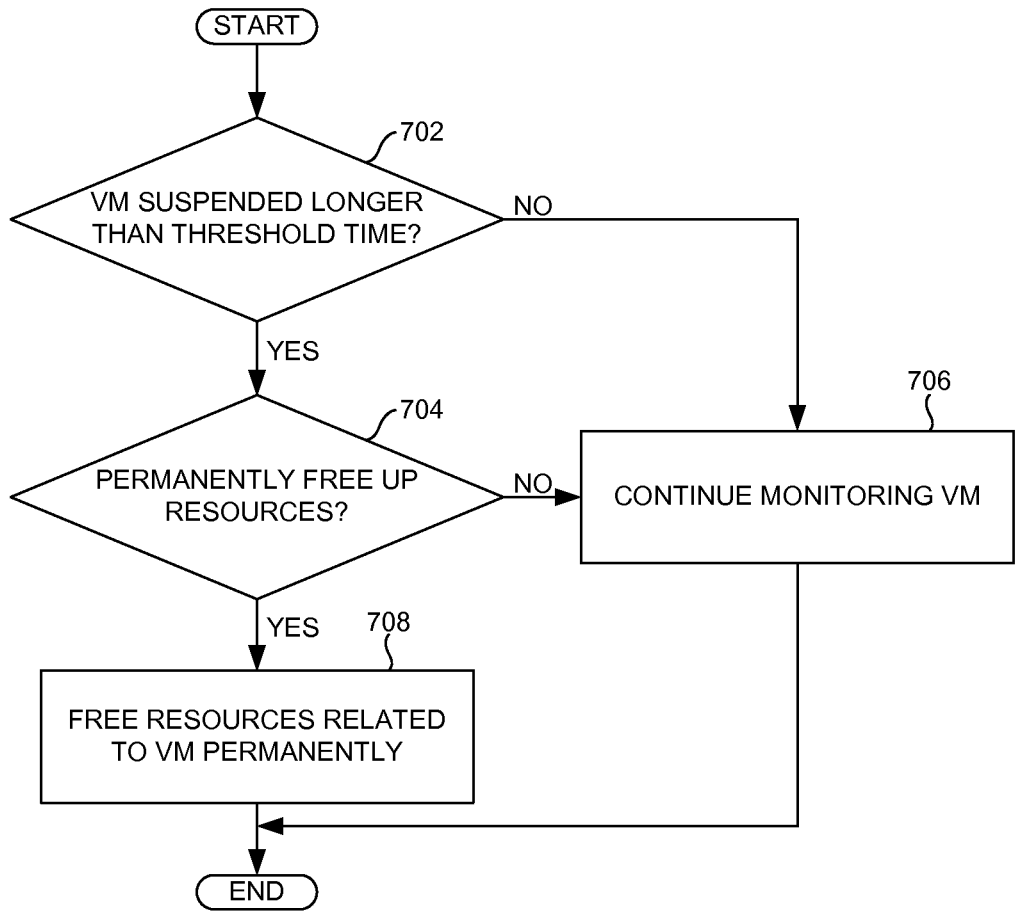
FIG. 7 is a flowchart detailing the operations involved in permanently freeing up resources related to a suspended VM based on a time of suspension, according to one or more embodiments.

The abovementioned process is summarized in the flowchart shown in FIG. 7. In one or more embodiments, operation 702 may involve checking as to whether VM 302 is suspended for a time longer than a threshold value. In one or more embodiments, if VM 302 has been suspended for a time longer than the threshold value, operation 704 may involve providing an option to permanently free resources related to VM 302. In one or more embodiments, if the user chooses to permanently free resources related to VM 302, operation 708 may involve freeing the resources related to VM 302 permanently. In one or more embodiments, if VM 302 has not been suspended for a time longer than the threshold value, VM 302 may continue being monitored in operation 706. In one or more embodiments, if the user chooses not to permanently free resources related to VM 302, VM 302 may, again, continue being monitored as in operation 706.

In one or more embodiments, VM 302 may continue to share vswitch 208 with appliance VM 202, after VM 302 has been "woken up" as described above. In one or more embodiments, the user may be prompted with an option to move the resumed VM 302 to a different vswitch, in which case VM 302 may be decoupled from vswitch 208 and coupled to the new vswitch. In one or more embodiments, Distributed Resource Scheduler (DRS) algorithms may be employed to move VM 302 to a host computer different from the one on which appliance VM 202 is resident, based on the resource requirements of VM 302 and/or the resource utilization on the host computer to which VM 302 is moved.

Figure 8:
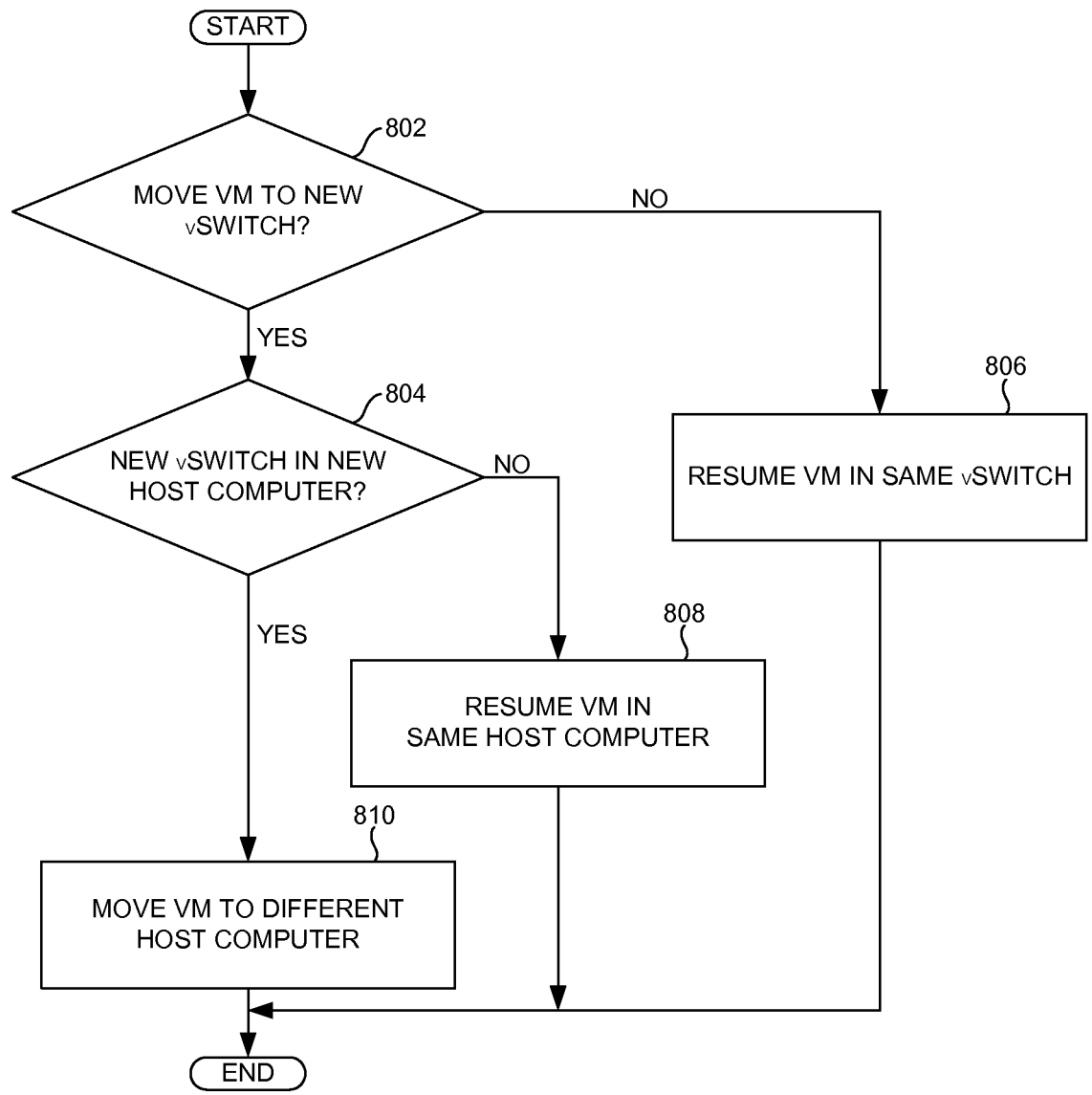
FIG. 8 is a flowchart detailing the operations involved in providing an option to move a VM to a new host computer/new virtual switch after suspension, according to one or more embodiments.

The abovementioned process is summarized in the flowchart shown in FIG. 8. In one or more embodiments, operation 802 may involve providing an option to move the "woken up" VM 302 to a new vswitch. In one or more embodiments, operation 804 may be an option provided as part of a DRS algorithm to check if moving VM 302 to a new vswitch in a new host computer different from that on which appliance VM 202 is resident is required. In one or more embodiments, operation 810 may involve moving VM 302 to a vswitch in a different host computer based on the requirement in operation 804. In one or more embodiments, if moving VM 302 to a new switch is not required in operation 802, operation 806 may involve resuming VM 302 using the same vswitch 208. In one or more embodiments, if moving VM 302 to a new host computer is not required in operation 804, operation 808 may involve coupling VM 302 to a new vswitch in the same host computer to resume VM 302.

In one embodiment, a resource pool or cluster of host computers may each have one appliance VM 202. In one or more embodiments, as appliance VM 202 and the virtual center may communicate with each other, settings for the entire data center need not be maintained in appliance VM 202. In one or more embodiments, uniform granular policies may, therefore, be applied via the virtual center for the entire datacenter.

In one or more embodiments, vNIC 210 may have an identification data associated thereof analogous to pNIC 206. In one or more embodiments, the destinations of packets arriving at the physical switch may be identified using the destination identification data (e.g., destination MAC address). In one or more embodiments, therefore, the physical switch may know the port associated with the destination identification data. In one or more embodiments, in order to build a table (e.g., MAC lookup table) of the identification data and the associated ports, the physical switch may continuously monitor the packets arriving at the physical switch.

In one or more embodiments, as the identification data of vNIC 210 may be registered and the identification data of pNIC 206 may be the same for all VMs (considering a number of VMs on a host computer) on a particular host computer, the time-out problem associated with the flushing of identification data of a suspended VM 302 during handling of traffic directed to the suspended VM 302 may be avoided by having appliance VM 202 up at all times. In one or more embodiments, network traffic directed to suspended VMs may be routed to the appropriate destinations through the aid of appliance VM 202.

In one or more embodiments, as a separate table indicating destination identification data of network traffic may be maintained at appliance VM 202, packets in the network traffic may be placed in a queue. In one or more embodiments, because the packets in the network traffic may be queued by appliance VM 202 and later transmitted to VM 302 during the resumption thereof, there may be no data loss during the entire duration between the suspension and the resumption of VM 302. Similarly, in one or more embodiments, non-network requests may be queued by appliance VM 202 and later transmitted to VM 302 during the resumption thereof, leading to no data loss during the duration between the suspension and the resumption of VM 302. In other words, requests intended for suspended VM 302 may, therefore, be losslessly handled. In one or more embodiments, VM 302 may appear "alive" to an end user even during a state of suspension.

In one or more embodiments, the user may have his environment optimized and may have the ability to power on more VMs on the same hardware, thereby executing more application workloads. In one or more embodiments, in a setup where the user pays a cloud/hosting service provider on a per VM basis, resource utilization and optimization may be done such that VMs are made active only during a time of the day when the network experiences peak loads. In one or more embodiments, the cost per VM, therefore, may be reduced and resources available to each VM may be increased. In one or more embodiments, the reduction of resources needed to spawn additional VMs may lead to savings on power and cooling costs. Even if new VMs may not be powered on, a host computer that is loaded less may consume less power and need less cooling, resulting in cost savings to the customer.

In one or more embodiments, resources may be released in a limited manner to allow a limited number of VMs to be powered on. For example, if a VM 302 suspended due to inactivity requires 1 GB of memory to resume and is assigned 2 GB of memory, only 1 GB of memory may be released to the unallocated pool to ensure that VM 302 gets the 1 GB required to resume. In one or more embodiments, this may also ensure that VM 302 is not left waiting for resources upon resumption. Further, in one or more embodiments, this may ensure that the user does not cause the system to operate at a higher clock rate than normal unnecessarily.

In one or more embodiments, resource reservation may not be provided to VMs. For example, a predetermined amount of resources (e.g., 512 MB of RAM) may not be needed to be allocated to a VM. In one or more embodiments, this may result in the resource allocation being comprehensive and dynamic.

In one or more embodiments, "freed up" resources may be kept track of to enable the broadcast of messages to VM system 200 when the host computer may be operating at a higher clock rate than normal. In one or more embodiments, the tracking of "freed up" resources may enable a hard resource limit to be imposed on new VMs being powered on.

In one or more embodiments, resource consumption in VM system 200 may be balanced by migrating VMs (e.g., using VMware®'s VMotion™) across multiple host servers.

Figure 9:
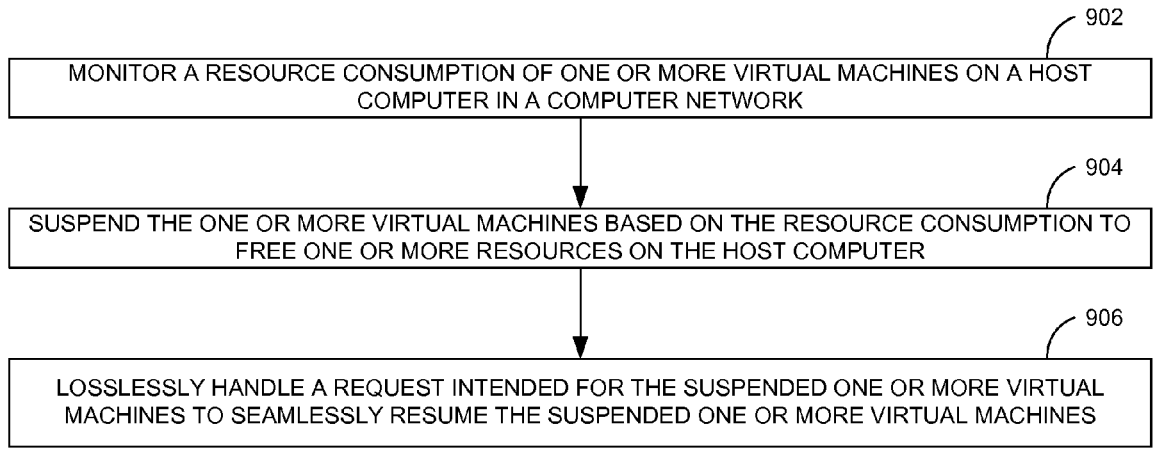
FIG. 9 is a process flow diagram detailing the operations involved in seamlessly suspending/resuming one or more virtual machines in a host computer, according to one or more embodiments.

FIG. 9 is a process flow diagram detailing the operations involved in seamlessly suspending/resuming one or more virtual machines in a host computer, according to one or more embodiments. In one or more embodiments, operation 902 may involve monitoring a resource consumption of one or more VMs on a host computer in a computer network. In one or more embodiments, operation 904 may involve suspending the one or more VMs based on the resource consumption to free one or more resources on the host computer.

In one or more embodiments, operation 906 may involve losslessly handling a request intended for the suspended one or more VMs to resume the suspended one or more VMs. In one or more embodiments, the request may include a network traffic intended for the suspended one or more VMs and/or a non-network request that includes a storage protocol request and/or a network protocol request.

Figure 10:
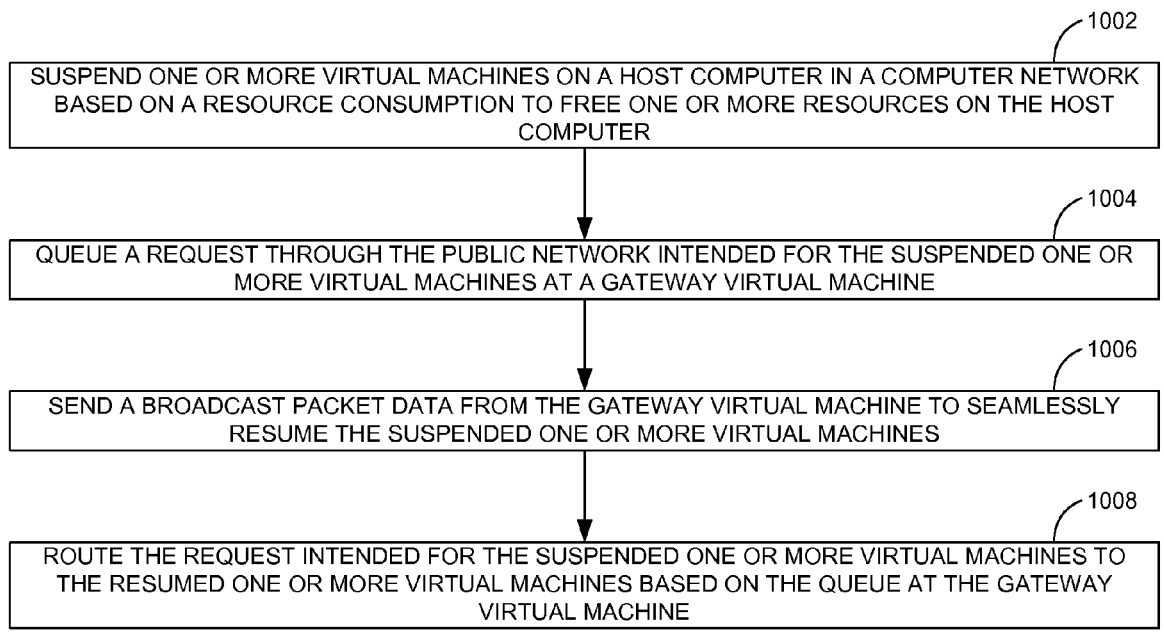
FIG. 10 is a process flow diagram detailing the operations involved in seamlessly resuming a suspended VM without downtime, according to one or more embodiments.

FIG. 10 is a process flow diagram detailing the operations involved in seamlessly resuming a suspended VM without downtime, according to one or more embodiments. In one or more embodiments, operation 1002 may involve suspending one or more VMs on a host computer in a computer network based on a resource consumption to free one or more resources on the host computer. In one or more embodiments, operation 1004 may involve queuing a request intended for the suspended one or more VMs at appliance VM 202.

In one or more embodiments, operation 1006 may involve sending a broadcast packet data from appliance VM 202 to seamlessly resume the suspended one or more virtual machines. In one or more embodiments, operation 1008 may involve routing the request intended for the suspended one or more virtual machines to the resumed one or more virtual machines based on the queue at appliance VM 202.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method comprising:
    monitoring a resource consumption of a virtual machine on a host computer in a computer network;
    suspending the virtual machine based on the resource consumption, including at least one of a central processor utilization, a memory utilization, a network Input/Output (I/O), and a storage I/O of the virtual machine, to free at least one resource on the host computer; and
    losslessly handling a request intended for the suspended virtual machine to seamlessly resume the suspended virtual machine, the request including at least one of a network traffic intended for the suspended virtual machine and a non-network request,
    wherein the suspending of the virtual machine comprises:
        decoupling the virtual machine from a first virtual switch;
        coupling the virtual machine to a second virtual switch to which an appliance virtual machine is coupled, wherein the second virtual switch has no connectivity with a physical network interface such that the second virtual switch has no uplink; and
        updating routing information of the appliance virtual machine to enable routing of the request destined for the virtual machine through the appliance virtual machine,
        wherein the decoupling, coupling and updating are executed in response to determining that the resource consumption is below a threshold.

2. The method of claim 1, wherein the non-network request includes at least one of a storage protocol request, a network protocol request, a communication between a plurality of virtual machines on the host computer, and a communication between the virtual machine and the host computer.

3. The method of claim 1, further comprising profiling the resource consumption of the virtual machine based on a threshold minimum of utilization of the at least one resource.

4. The method of claim 1, further comprising saving a current configuration of the virtual machine prior to suspending the virtual machine.

5. The method of claim 1, comprising powering on the suspended virtual machine through a user to resume the suspended virtual machine.

6. The method of claim 1, further comprising permanently freeing the at least one resource on the host computer based on a threshold value of a time for which the virtual machine is suspended.

7. The method of claim 1, further comprising (a) determining whether the appliance virtual machine is resident on the host computer and, if not, (b) migrating the virtual machine to the same host computer on which the appliance virtual machine is resident prior to the coupling the virtual machine to the second virtual switch.

8. The method of claim 1, wherein the losslessly handling at least one of the network traffic intended for the suspended virtual machine and the non-network request intended for the suspended virtual machine to seamlessly resume the suspended virtual machine includes a corresponding at least one of:
    saving packets in the network traffic destined for the suspended virtual machine through the appliance virtual machine;
    transmitting a network message through the appliance virtual machine to wake up the suspended virtual machine; and
    transmitting the packets in the network traffic destined for the suspended virtual machine to the woken up virtual machine as losslessly handling the network traffic intended for the suspended virtual machine, and communicating the non-network request to the suspended virtual machine through the kernel module as losslessly handing the non-network request intended for the suspended virtual machine.

9. The method of claim 1, further comprising determining whether the virtual machine resides on the same host computer as the appliance virtual machine prior to the suspension of the virtual machine, wherein the virtual machine is not migrated to another host computer if the virtual machine does reside on the same host computer as the appliance virtual machine.

10. The method of claim 6, further comprising limiting the release of the at least one resource to power on a limited plurality of virtual machines.

11. The method of claim 6, further comprising preventing a predetermined allocation of the at least one resource to the virtual machine.

12. The method of claim 6, further comprising:
monitoring the freed up at least one resource; and
imposing a resource limit on a new virtual machine to be powered on based on the monitoring of the freed up at least one resource.

13. The method of claim 6, further comprising optimizing the suspension of the virtual machine to render the virtual machine active solely during a time when the computer network experiences a peak load.

14. The method of claim 8, further comprising:
decoupling the woken up virtual machine from the second virtual switch; and
coupling the woken up virtual machine to one of the first virtual switch and a new virtual switch, prior to transmitting the packets in the network traffic to the woken up virtual machine.

15. The method of claim 14, further comprising migrating the woken up virtual machine to one of the original host computer on which the woken up virtual machine was resident prior to suspension and a new host computer prior to transmitting the packets in the network traffic to the woken up virtual machine based on at least one of a resource requirement of the woken up virtual machine and a resource utilization of the host computer to which the woken up machine is moved.

16. A method comprising:
suspending a virtual machine on a host computer in a computer network based on a resource consumption, including at least one of a central processor utilization, a memory utilization, a network Input/Output (I/O), and a storage I/O of the virtual machine, to free at least one resource on the host computer;
queuing a request intended for the suspended virtual machine at an appliance virtual machine;
sending a broadcast packet data from the appliance virtual machine to seamlessly resume the suspended virtual machine; and
losslessly routing the request intended for the suspended virtual machine to the resumed virtual machine based on the queue at the appliance virtual machine,
wherein the suspending the virtual machine comprises:
decoupling the virtual machine from a first virtual switch;
coupling the virtual machine to a second virtual switch to which the appliance virtual machine is coupled, wherein the second virtual switch has no connectivity with a physical network interface such that the second virtual switch has no uplink; and
updating a routing information of the appliance virtual machine to enable routing of the request destined for the virtual machine through the appliance virtual machine,
wherein the decoupling, coupling and updating are executed in response to determining that the resource consumption is below a threshold.

17. The method of claim 16, wherein the request includes at least one of a network traffic intended for the suspended virtual machine and a non-network request including at least one of a storage protocol request, a network protocol request, a communication between a plurality of virtual machines on the host computer, and a communication between the virtual machine and the host computer.

18. The method of claim 17, wherein losslessly routing the non-network request intended for the suspended virtual machine includes communicating the non-network request to the suspended virtual machine through a kernel module.

* * * * *